Sept. 25, 1962     M. T. SGRICCIA ETAL     3,055,311
TROLLEY CONTROL

Filed Nov. 9, 1960     2 Sheets-Sheet 1

INVENTOR.
MARIO THOMAS SGRICCIA
ROY FERRARI
BY
ATTORNEYS

Sept. 25, 1962    M. T. SGRICCIA ETAL    3,055,311
TROLLEY CONTROL
Filed Nov. 9, 1960    2 Sheets-Sheet 2
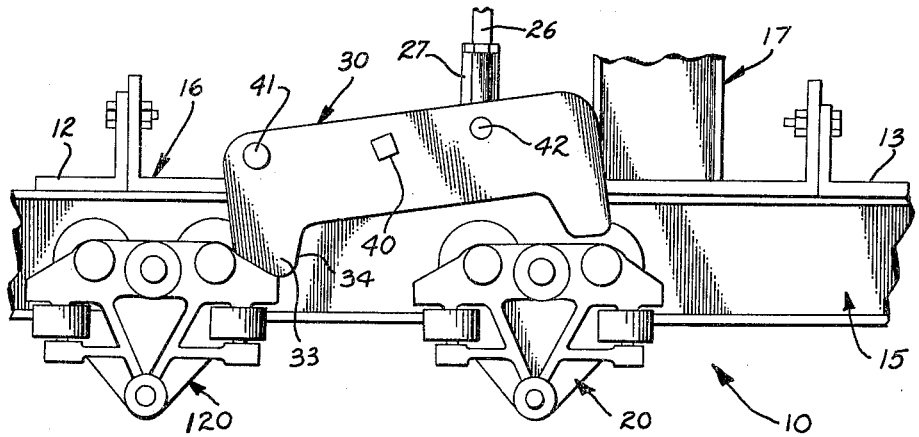
Fig. 4
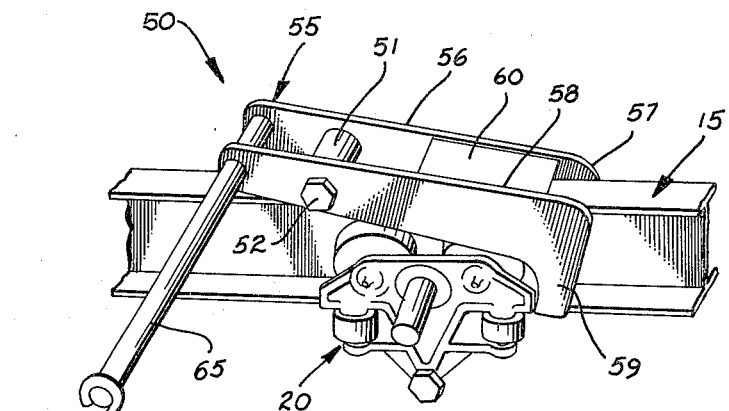
Fig. 5
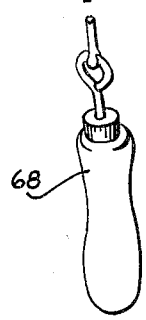
INVENTOR.
MARIO THOMAS SGRICCIA
BY ROY FERRARI
ATTORNEYS

United States Patent Office 3,055,311
Patented Sept. 25, 1962

3,055,311
TROLLEY CONTROL
Mario Thomas Sgriccia, Detroit, and Roy W. Ferrari, Royal Oak, Mich., assignors to Rapistan-Keystone, Inc., Detroit, Mich., a corporation of Michigan
Filed Nov. 9, 1960, Ser. No. 68,230
5 Claims. (Cl. 104—93)

This invention relates to a trolley control, and more particularly to a trolley control which includes means for advancing the trolley as well as stopping the trolley.

For various reasons it is often necessary to stop a gravity-propelled trolley which moves on an overhead conveyor track. Once the trolley has been stopped it is sometimes difficult to start it moving again even though the control mechanism is moved out of its path of travel, because the inclination of the conveyor may be sufficient to overcome dynamic friction but insufficient to overcome static friction. This is particularly true when the mechanism has been used for a long period, since continuous stopping of the trolleys in one position tends to form a pocket in the conveyor track into which the wheels of the trolley settle. If the trolley is carrying a heavy article it is still more difficult for the trolleys to start moving on their own initiative.

To overcome this problem some type of mechanism is necessary to start the trolley moving after it has been stopped by the control mechanism. Although mechanism to accomplish this is presently known, it is of a complicated nature which often results in erratic operation requiring a high degree of maintenance. Also, the initial cost of constructing the mechanism is high.

Applicants have overcome the above problems by designing a trolley control wherein the mechanism which directly controls the trolley is a one piece unit. This unit not only stops the trolley to control its movement along the conveyor track, but also upon release of the trolley positively moves it from contact with the trolley control mechanism.

It is therefore an object of this invention to provide a trolley control which will stop a trolley traveling on a conveyor track, release the trolley, and upon release of the trolley move it out of contact with the trolley control.

Yet another object of this invention is to provide a trolley control which upon release of the trolley prevents passage of another trolley during the release operation.

Still another object of this invention is to provide a trolley control which is constructed from a minimum number of component parts and is therefore economical to manufacture and maintain.

These and other objects and advantages of this invention will become more apparent upon reading the specification in conjunction with the accompanying drawings.

In the drawings:

FIG. 4 is a side elevational view of the trolley control assembly showing the control in the releasing position;

FIG. 5 is a perspective view of a modified form of trolley control.

Figure 1:
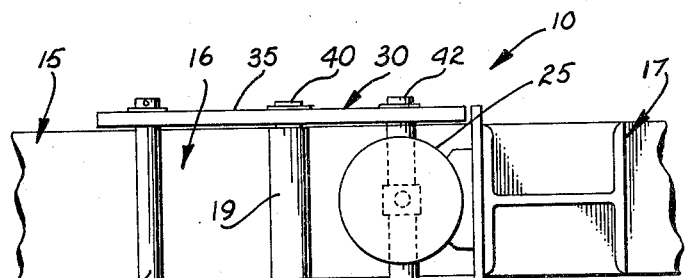
FIG. 1 is a plan view of the trolley control.

Basically, this invention relates to a device for controlling the movement of trolleys along an overhead conveyor track. A support plate having an upright support beam is fixedly secured to the conveyor track to support the control mechanism. The control includes a pair of arms which straddle the conveyor track and are pivotally connected to the support plate. The arms have downwardly depending fingers disposed at their opposite ends. Actuator mechanism is supported by the upright support beam and is connected by linkage to the control arms. The actuator mechanism normally maintains one of the fingers on the control arms in the path of travel of the trolley thus acting as a stop. Energization of the actuator mechanism pivots the fingers which act as stops out of the pathway of a trolley to allow the trolley to pass. Fingers at the opposite end of the control have cam surfaces which engage the opposite end of the trolley and push the trolley forward. The fingers having the cam surfaces also have surfaces which prevent passage of a succeeding trolley during the release operation.

The trolley control assembly is designated generally as 10. The assembly includes the support plate and support beam 16 and 17 respectively, the actuator mechanism 25, and the control 30. This mechanism is associated with an overhead conveyor track 15 which provides support and guide means for trolley members 20 and 120 which move on the conveyor track in the direction of the arrow T.

Figure 2:
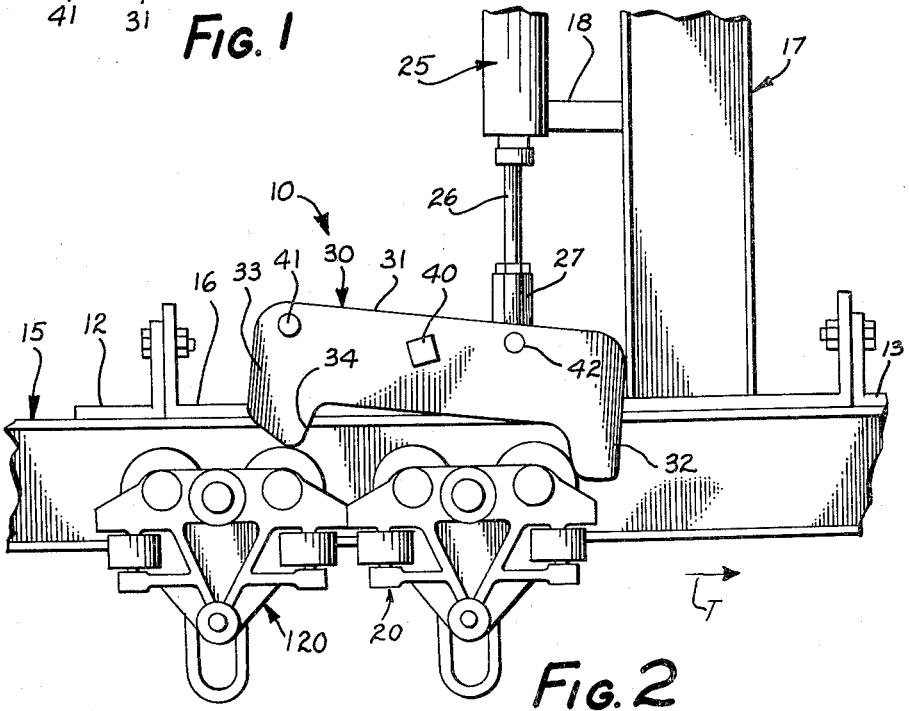
FIG. 2 is a side elevational view of the trolley control assembly showing the control in position to stop a trolley moving on the conveyor track.
Figure 3:
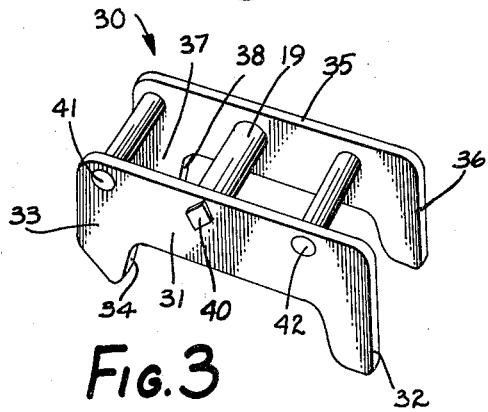
FIG. 3 is a perspective view showing the control member per se.

Referring now more specifically to the details of the invention, FIG. 2 best illustrates the conveyor track 15 and support mechanism associated therewith. The conveyor track 15 is of conventional I-beam design. A pair of L-shaped anchor members 12 and 13 are secured to the top of the conveyor track 15. The anchor members 12 and 13 face each other and are spaced apart a sufficient distance to receive the support plate 16 therebetween. The support plate 16 is a generally U-shaped member having upturned flanges which abut the anchor members 12 and 13. Fastener members, such as convention carriage bolts, connect the support plate 16 to the anchor members 12 and 13.

A support beam 17 is affixed to the support plate 16 by well-known means such as welding, and projects transversely therefrom in an upright position. The support beam 17 is also a conventional I-beam member.

Also affixed to the support plate 16 is a pivot pin housing 19. The pivot pin housing 19 is in the form of a cylinder the bore thereof operating as a bearing for the pivot pin and a fulcrum for the control both of which will be explained more fully hereinafter.

A support bracket 18 is secured to the support beam 17 and supports an actuator 25. The actuator 25 is an air motor; however, it is to be understood that within the broadest aspect of the invention other types of actuators may be utilized. The actuator 25 has an actuator rod 26 which threadedly engages a connector 27. The connector 27 has a pivotal connection with the control 30 now to be described.

The control 30 has a pair of arms 31 and 35 which are connected together adjacent the opposite ends thereof by tie bars 41 and 42. The arm 31 has a first finger 32 which is disposed at one end thereof and depends downwardly therefrom. A second finger 33 is disposed at the opposite end of the arm and also depends downwardly therefrom. The second finger has a cam surface 34 for purposes which will be explained more fully hereinafter.

The arm 35 is similar in design to the arm 34 and has a first finger 36 which depends downwardly therefrom and is disposed diametrically opposite the first finger 32 on arm 31. A second finger 37 is disposed at the opposite end of arm 35 and depends downwardly therefrom. The second finger 37 is diametrically opposite the second finger 33 on arm 31. The second finger 37 has a cam surface 38 for purposes which will be explained more fully hereinafter. The arms 31 and 35 are provided with opposed apertures formed transversely therethrough to receive a pivot pin 40. The pivot pin 40 projects through the apertures and the bore of the pivot pin housing 19 to pivotally mount the control 30 on the support plate 16. The ends of the pivot pin are provided with conventional means for retaining the pin in position with respect to the control. This retainer means may be a washer and cotterpin at each end (not shown). The apertures formed in the arms 31 and 35 are approximately centered longitudinally of the control.

A connector 27 is pivotally connected to the tie bar 42. Movement of the actuator rod 26 will cause the control 30 to pivot about the pivot pin 40.

Modification

FIG. 5 shows a modified form of trolley control assembly. The assembly is designated generally as 50 and includes the pivot pin bracket 51, the control 55, and actuator 65.

The pivot pin bracket 51 is a sleeve-like member which is affixedly secured to the top of a conveyor track such as 15. The pivot pin bracket has a bore which acts as a bearing for the pivot pin 52 and also as a fulcrum for the control 55.

The trolley control 55 has a pair of arms 56 and 58 which are connected together by a plate 60. The arm 56 has a downwardly depending finger 57, and the arm 58 which is of similar design has a downwardly depending finger 59 which is diametrically opposite the finger 57. The fingers 57 and 59 are disposed at the one extremity of the arms.

At the other extremity of the arms is an actuator rod 65 which extends traversely through the ends of the arms and is connected thereto. The actuator rod 65 projects a substantial distance beyond the arm 58. An S-shaped connector 66 is associated with the end of the actuator rod 65. A cable 67 to which is attached a handle 68 is secured to the connecter 66.

The control 55 straddles the conveyor track 15 and the arms 56 and 58 thereof are provided with an opening which allows passage of the pivot pin 52. The pivot pin 52 pivotally connects the control member 55 to the conveyor track. The pivot pin 52 is provided with conventional retaining means to fix it in position and prevent withdrawal of the pin and control unit from the conveyor track 15. The pivot pin 52 is positioned on the arms 56 and 58 a substantial distance from the center of gravity of the control such that the fingers 57 and 59 on the arms pivot into trolley stopping position under the force of gravity.

Operation

The trolley control assembly 10 operates to stop and retain trolleys 20 and 120 moving along the conveyor track 15. The movement of the trolleys along the conveyor track can thereby be controlled. When desired the control can be actuated releasing the trolley 20 for continued travel on the conveyor track.

FIG. 2 best shows the control 30 in the position to stop and retain trolley 20 moving along the conveyor track. The wheels of the trolley 20 abut the fingers 32 and 36 of the control which prevent passage of the trolley 20. The control normally assumes this position.

Upon actuation of the motor 25 the actuator rod 26 will be drawn upwardly thus pivoting the control 30 about the pin 40 and withdrawing the fingers 32 and 36 from the path of travel of the trolley as illustrated in FIG. 4. As the fingers 32 and 36 are pivoted out of the path of travel of the trolley the fingers 33 and 37 are pivoted into the path of travel of an oncoming trolley 120. Simultaneously the cam surfaces 34 and 38 of the fingers 33 and 37 engage the back side of the trolley 20 which was retained by the control and cams or moves it out from under the control. If another trolley 120 is in position to enter the control upon release of the proceeding trolley, it is moved back on the conveyor a slight distance by the surfaces formed on the back of the second fingers 33 and 37 which also prevent passage of the trolley 120. FIG. 4 shows a trolley 20 which has been acted upon by the cam surfaces 34 and 38 and which is moving out from under the control unit. This figure also shows the fingers 33 and 37 preventing passage of an oncoming trolley 120 during the release operation. After the trolley 20 has passed from beneath the control 30 the actuator mechanism completes its cycle and returns the control 30 to the position shown in FIG. 2. The oncoming trolley 120 is then allowed to advance until it abuts the fingers 32 and 36.

The operation of the trolley control assembly 50 is usually accomplished manually; however, it is to be understood that the actuator rod may be connected to power mechanism. As is shown in FIG. 5 the trolley 20 abuts the fingers 57 and 59 which prevents passage of the trolley. If it is desired to release the trolley a workman merely grasps the handle 68 and pulls downwardly thereon to pivot the control 55 out of the path of travel of the trolley. Since the control 55 is pivoted off center, the weight of the arms 56 and 58 will cause the control 55 to move back into the path of travel of an oncoming trolley.

From the above disclosure it can be seen that the trolley control shown in FIGS. 1 through 4 provides an arrangement whereby the trolleys may be stopped and retained, and when released are cammed into movement. These functions are all accomplished by a unitary control member. The control also prevents passage of other trolleys traveling on the track during the release operation. The trolley control is constructed from a minimum number of simply designed component parts thus assuring maintenance free operation. Due to the simple and straightforward construction of the trolley control the initial cost of manufacture is greatly reduced.

While a preferred embodiment of this invention and a modification thereof has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. A trolley control comprising; support means adapted to be secured to a conveyor track, trolley control means pivotally mounted on said support means and positioned adjacent said conveyor track, said trolley control means having spaced first and second fingers, said first fingers adapted to engage and retain a trolley on said conveyor track, means for pivoting said first fingers out of contact with said trolley and said second fingers into contact with said trolley, said second fingers having cam surfaces engaging said trolley and moving it away from said trolley control.

2. A trolley control as in claim 1 wherein said second fingers have stop surfaces which prevent entry of a second trolley during release of said trolley.

3. A trolley control comprising; support means adapted to be secured to a conveyor track, trolley control means pivotally mounted on said support means, said trolley control means including a pair of spaced arms connected together by tie bars at each end, said arms straddling said conveyor track, downwardly projecting first fingers formed at one end of said arms and downwardly projecting second fingers formed on the other end of said arms, actuator means connected to one of said tie bars for pivoting said trolley control means, said actuator normally maintaining said first fingers in the path of travel of a trolley adapted to move on said conveyor track to stop said trolley, movement of said actuator pivoting said first fingers out of contact with said trolley and said second fingers into contact with said trolley, said second fingers having cam surfaces engaging said trolley to move it along said conveyor track and from said trolley control means, said second fingers having stop surfaces preventing a second trolley from moving beneath said trolley control means during the release of said trolley.

4. A trolley control comprising; support means adapted to be secured to a conveyor track, trolley control means pivotally mounted on said support means and overlying said conveyor track, said trolley control means having fingers disposed at opposite ends thereof, one of said fingers normally pivoted into the path of travel of a trolley, actuator means for pivoting said one finger out of the path of travel of said trolley and the other finger into contact therewith, said other finger having a cam surface for camming said trolley away from said trolley control means upon being pivoted into contact therewith.

5. A trolley control comprising; support means adapted to be secured to a conveyor track, trolley control means having a pair of spaced arms straddling said conveyor track, said trolley control means being pivotally connected centrally thereof to said support means, downwardly depending fingers formed on opposite ends of said arms, actuator means for normally maintaining the fingers at one end of said arms in the path of travel of a trolley adapted to move on said conveyor track, energization of said actuator means moving said fingers at said one end of said control means out of the path of travel of said trolley and said fingers at said other end into contact with said trolley, and cam means on said fingers at said other end engaging said trolley upon being pivoted into contact therewith to cam said trolley from association with said trolley control means.

References Cited in the file of this patent

UNITED STATES PATENTS

| | | |
|---|---|---|
| 618,396 | Cowles | Jan. 31, 1899 |
| 1,494,696 | Maclaren | May 20, 1924 |
| 1,556,438 | Hanson et al. | Oct. 6, 1925 |
| 1,917,836 | Haddlesay | July 11, 1933 |
| 2,318,180 | Morse | May 4, 1943 |
| 2,679,810 | Schutt | June 1, 1954 |
| 2,832,297 | Daniels | Apr. 29, 1958 |
| 3,011,456 | Lyons | Dec. 5, 1961 |